(12) United States Patent
Mukherjee et al.

(10) Patent No.: US 7,478,427 B2
(45) Date of Patent: Jan. 13, 2009

(54) METHOD AND APPARATUS FOR PROVIDING ADAPTIVE VPN TO ENABLE DIFFERENT SECURITY LEVELS IN VIRTUAL PRIVATE NETWORKS (VPNS)

(75) Inventors: Sarit Mukherjee, Morganville, NJ (US); Sanjoy Paul, Marlboro, NJ (US); Sampath Rangarajan, Bridgewater, NJ (US); Anil Takkallapalli, Somerset, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 794 days.

(21) Appl. No.: 10/429,815

(22) Filed: May 5, 2003

(65) Prior Publication Data

US 2004/0225895 A1    Nov. 11, 2004

(51) Int. Cl.
*G06F 21/00* (2006.01)
*G06F 15/16* (2006.01)
*H04L 9/00* (2006.01)

(52) U.S. Cl. .......................................... 726/15; 709/228
(58) Field of Classification Search ................ 726/12
See application file for complete search history.

(56) References Cited

U.S. PATENT DOCUMENTS

| | | | |
|---|---|---|---|
| 6,484,257 B1 * | 11/2002 | Ellis ............................ | 713/153 |
| 6,539,483 B1 * | 3/2003 | Harrison et al. ................ | 726/1 |
| 6,615,357 B1 * | 9/2003 | Boden et al. ................... | 726/15 |
| 6,816,462 B1 * | 11/2004 | Booth et al. ................. | 370/248 |
| 6,823,462 B1 * | 11/2004 | Cheng et al. .................. | 726/15 |
| 6,978,308 B2 * | 12/2005 | Boden et al. ................. | 709/229 |
| 6,993,037 B2 * | 1/2006 | Boden et al. ................. | 370/401 |
| 7,028,333 B2 * | 4/2006 | Tuomenoksa et al. .......... | 726/3 |
| 7,028,334 B2 * | 4/2006 | Tuomenoksa .................. | 726/3 |
| 7,085,854 B2 * | 8/2006 | Keane et al. ................. | 709/250 |
| 7,107,613 B1 * | 9/2006 | Chen et al. .................... | 726/14 |
| 7,107,614 B1 * | 9/2006 | Boden et al. .................. | 726/15 |
| 7,117,526 B1 * | 10/2006 | Short ............................. | 726/5 |
| 7,117,530 B1 * | 10/2006 | Lin ............................. | 726/15 |
| 7,131,141 B1 * | 10/2006 | Blewett et al. ................ | 726/12 |
| 7,237,260 B2 * | 6/2007 | Yu et al. ....................... | 726/11 |
| 2002/0122394 A1 * | 9/2002 | Whitmore et al. ........... | 370/328 |
| 2003/0131263 A1 * | 7/2003 | Keane et al. ............. | 713/201 |
| 2003/0135753 A1 * | 7/2003 | Batra et al. ................. | 713/201 |
| 2004/0148430 A1 * | 7/2004 | Narayanan .................. | 709/238 |

* cited by examiner

*Primary Examiner*—Christopher A Revak

(57) ABSTRACT

A method and apparatus for providing at least two virtual private network VPN tunnels from a client device in a VPN network having an enterprise gateway and a network VPN gateway. The method and apparatus includes a client device having an Internet Key Exchange (IKE) module for establishing the at least two tunnels using an IKE protocol wherein a first tunnel is an end-to-end VPN tunnel to the enterprise gateway, and a second tunnel is a network-based tunnel to the network VPN gateway. An IPsec Network Driver Interface interfaces with the IKE module, which includes a security authentication database (SADB) that stores downloaded enterprise security policies respectively for each of the at least two tunnels. A routing table stores IP addresses of local presences and hosts respectively associated with the at least two tunnels, whereby packets are routed over the at least two tunnels based on the downloaded policies.

27 Claims, 9 Drawing Sheets

METHOD AND APPARATUS FOR PROVIDING ADAPTIVE VPN TO ENABLE DIFFERENT SECURITY LEVELS IN VIRTUAL PRIVATE NETWORKS (VPNS)

FIELD OF INVENTION

The present invention relates to virtual private networks (VPNs). More specifically, the present invention relates to providing value-added services in VPNs by enabling different security levels.

BACKGROUND OF THE INVENTION

An End-to-End VPN session provides complete privacy and data integrity for enterprise users who access the enterprise network from outside the intranet. However, because packets are encrypted end-to-end from the client to the enterprise VPN gateway, it is not possible for Network Service Providers (NSPs) to provide value-added services to these enterprise users, as such services require visibility into the packet headers and application data. A Network-based VPN allows termination of the user VPN session at an IP service switch (IPSS) within the NSP's network. Another VPN session from the IPSS to the enterprise VPN gateway is used to carry traffic from the IPSS to the enterprise. Because packet headers and application data are visible in the clear at the IPSS, value-added services can be provided by the IPSS.

The advantages of Network-based VPN are two fold. First, data aggregation and scalability are achieved by terminating all VPN sessions from the clients at the IPSS and transporting data packets over a single VPN session from the IPSS to the Enterprise VPN gateway. Since the Enterprise VPN gateway needs to terminate only one VPN session, even when the number of VPN users to the enterprise increases, the amount of VPN session information, including Security Association (SA) information, that needs to be maintained at the VPN gateway does not increase. Thus, data aggregation for VPN sessions in itself is a value-added service that an NSP can offer to its customers.

Second, by being able to decrypt the packet at the IPSS, value-added services, such as firewall service, internet-offload, caching service, among others, which require packet and application header inspection become possible. These services increase the revenue opportunities for NSPs and also benefit enterprises because they are able to outsource these services to the NSP. It is noted that with End-to-End VPNs, such services are not possible because the headers are not visible in the network.

The Network-based VPN approach allows the data transported between the VPN client and the Enterprise VPN gateway to be visible in the clear at the ISPP. Accordingly, enterprises need to be able to trust the NSP to preserve the integrity and privacy of this data within the IPSS. This appears to be a major concern that inhibits the enterprises from choosing a Network-based VPN service.

Moreover, VPN client software residing in the client device (e.g., desktop, PDA, laptop, mobile device, and the like) is only able to create a single VPN tunnel to either an Enterprise gateway (end-to-end VPN) or an IPSS (Network-based VPN). Accordingly, as the End-to-End VPN service and Network-based VPN service are currently offered, an enterprise has a limited option to decide on using either the End-to-End VPN service or the Network-based VPN service for all its users, as well as for all applications that a user accesses within the enterprise intranet.

SUMMARY OF THE INVENTION

The disadvantages heretofore associated with the prior art are overcome by the present invention of a method and apparatus for providing at least two virtual private network (VPN) tunnels from a client device in a VPN network having an enterprise VPN gateway and a network VPN gateway. The method and apparatus includes a client device having an Internet Key Exchange (IKE) module for establishing the at least two tunnels using an IKE protocol wherein a first tunnel is an end-to-end VPN tunnel to the enterprise VPN gateway, and a second tunnel is a network-based tunnel to the network VPN gateway.

An IPsec Network Driver Interface interfaces with the IKE module. This driver includes a security authentication database (SADB) that stores downloaded enterprise security policies respectively for each of the at least two tunnels. The IKE module establishes the at least two tunnels and pushes the information about these two tunnels into the SADB. This information includes the IP addresses of the end-points of the at least two tunnels at the respective VPN gateways and policies that specify the IP addresses of the hosts behind the tunnels, as well as the destination TCP ports on these hosts for which this tunnel should be used to carry traffic. Local presence IP addresses for each of the at least two tunnels are downloaded during IKE negotiation and stored in the client de/vice as well. A routing table stores the routes to reach the hosts behind the tunnels respectively associated with the at least two tunnels, whereby packets are routed over the at least two tunnels based on the downloaded policies.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides a VPN mechanism hereinafter referred to as "Adaptive VPN," which enables enterprises to selectively trade off end-to-end security for value-added services. Adaptive VPN enables traffic from a specific user to be carried both on an End-to-End VPN session and/or a Network-based VPN session based on the Network Access Identifier (NAI) of a user and the application that is being accessed. Although the implementation of the Adaptive VPN is discussed within the context of VPN security products of Lucent Technologies, Inc of Murray Hill, N.J., those skilled in the art will recognize that the teachings herein may be applied to other Lucent products, as well as those produced by other manufacturers/.

Virtual Private Networks (VPNs) enable enterprise users to get secure connectivity to their intranet. In a VPN, enterprise users run a VPN client program on their computers to initiate VPN sessions to a VPN gateway inside the intranet. The data packets that are carried over these sessions are authenticated as well as encrypted from the VPN client to the VPN gateway, and in the reverse direction from the VPN gateway to the VPN client. This allows data integrity and privacy for users that access enterprise data from outside the intranet. An End-to-End VPN is a VPN mechanism where VPN sessions are established from VPN clients to VPN gateways inside intranets.

The adaptive VPN mechanism enables enterprises to selectively transport some packets from/to a user on an End-to-End VPN session, and at the same time transport other packets from/to the same user on a Network-based VPN session, based on the application that is accessed by the user. Adaptive VPN provides enterprises the flexibility to enjoy the benefits of Network-based VPN for any user/application combination that the enterprise is willing to entrust with the NSP. At the same time the enterprises can transport data that requires a higher level of security using End-to-End VPNs. From the NSPs point of view, this flexibility increases the acceptability of Network-based VPNs to enterprises, thereby increasing the NSP revenue opportunities.

The decision at to which tunnel to send a packet over depends on the destination IP address, as well as the TCP port number, which specifies an application (e.g., web browsing, e-mail, among others.) Further, this policy could be different for different users (e.g., based on the Network Access Identifier (NAI) of a user).

The Adaptive VPN technique of the present invention does not require modification to current VPN standards. Depending on the VPN gateway implementation, minor or no modification is required within VPN gateways to support Adaptive VPN. Rather, to implement Adaptive VPN, the VPN client software on the client devices is modified to support the additional flexibility offered by the Adaptive VPN of the present invention.

Figure 1:
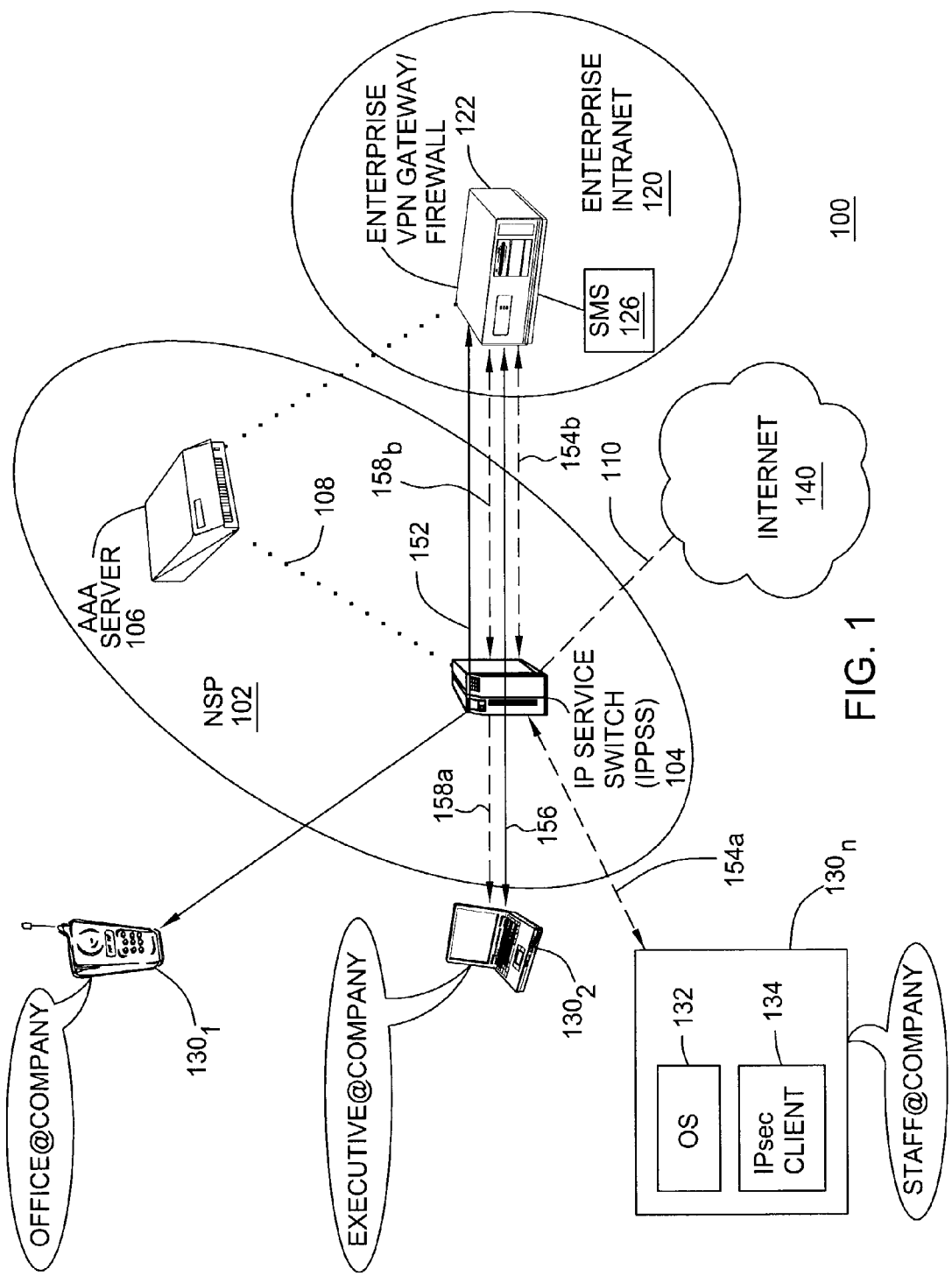
FIG. 1 depicts a block diagram of a network environment suitable for implementing adaptive VPN services of the present invention.

FIG. 1 depicts a block diagram of a network environment 100 suitable for implementing adaptive VPN services of the present invention. The network environment 100 comprises a network service provider (NSP) 102, an enterprise network (intranet) 120, a plurality of user devices 130, through 130$_n$ (collectively user devices 130, and where n is and integer greater than one), and a public network (e.g., the Internet) 140.

The NSP 102 comprises an IP service switch (IPSS) 104 and an authentication, administration, and accounting (AAA) server 106, which is in communication with the IPSS 104 via path 108. The IPSS 104 is a router that is also in communication with the Internet 140 via path 110. The Enterprise network 120 comprises an Enterprise VPN Gateway/Firewall (hereinafter "VPN gateway"), which serves as the server side end-point for the VPN tunnel. The VPN gateway 122 illustratively comprises a security management server (SMS) 126. The SMS 126 is a software-based system serving as a central repository for configuration management, audit collection, and alarm generation, for the VPN Gateway 122. All the changes to VPN Gateway configuration are performed using SMS 126. The SMS 126 also performs message exchanges with the client for an encryption key exchange protocol, such as Internet key exchange (IKE) to negotiate Security Associations for IKE (Phase 1)., as well as IKE to negotiate IPsec Security Associations (Phase 2). Policy information that is to be downloaded to the client is also sent from the SMS 126. The SMS software may be run in conjunction with LINUX and Windows operating systems. Although the SMS 126 is illustratively depicted as a server physically connected to the VPN gateway 122, the SMS 126 logically functions as a part of the VPN gateway 122.

The user devices (clients) 130 may include desktops, laptops, PDAs, mobile devices, or any other user device capable of transferring and processing IP packets. The client devices 130 comprise operating system (O/S) 132 and client software (IPsec client software) 134 to generate multiple VPNs, as discussed below in further detail with respect to FIG. 2.

As will be discussed in greater detail below, the above three components (user device 130, IPSS 104, and VPN gateway 122) are used to provide the adaptive VPN solution as follows. First, an IPsec client 134 stored in the user device 130 uses the Internet Key Exchange (IKE) protocol to exchange keys needed to establish an IPsec tunnel between itself and the VPN Gateway 122. The VPN Gateway 122 acts as an IKE proxy and forwards IKE packets between the IPsec client 134 and the SMS 126. Thus, the exchange of keys happens between the IPsec client 134 and the SMS 126 (and not the VPN Gateway 122). It is noted that the IPsec client does not know of the presence of the SMS 126, but rather the IPsec client 134 is only aware of communication with the VPN Gateway 122.

Recall that current technology only allows VPN clients to support the establishment of one VPN session at a time. In the case of Network-based VPN there are two IPsec tunnels, one from the VPN client device 130 to the IPSS 104 and another from the IPSS 104 to the Enterprise VPN gateway 122. VPN sessions initiated by VPN client programs are terminated within the NSPs network at a router (IPSS) 104 that can provide additional value-added services. Specifically, data packets from the user device 130 to the enterprise 120 are transported over the first VPN session from the VPN client to the IPSS in a secure manner. When packets are received at the IPSS 104, the IPSS 104 decrypts the inner IP header, the TCP header and the application payload. This data is now available in the clear at the IPSS 104, and the packets are encrypted again (using a different encryption key) and transported over the second IPsec tunnel to the VPN gateway 122 inside the intranet 120. As the IPSS 104 can aggregate traffic on IPsec tunnels from multiple clients onto one IPsec tunnel to the VPN Gateway 122, this in itself becomes a value-added service. Additionally, by using information contained in the headers and payload of the packets, the IPSS 104 can provide other value added services to the client session as described below in further detail.

In the case of End-to-End VPN, the IPsec tunnel end-points are the VPN client device 130 and the Enterprise VPN Gateway 122. As will be discussed in further detail with respect to FIG. 3, this means the inner IP header, the TCP header, and the application payload are not visible at the IPSS 104. The IPSS 104 is simply a router that routes packets based on the destination IP address on the outer IP header. Thus, the IPSS 104 cannot provide any value-added services to the client sessions. The Adaptive VPN of the present invention allows the VPN client 130 to accommodate multiple VPN sessions at the same time, where at least one session is from the client to the IPSS (i.e., a Network tunnel) and another session is from the client to the Enterprise VPN Gateway (i.e., an Enterprise tunnel).

There are two variations of Adaptive VPN: (i) a User-based Adaptive VPN and (ii) an Application-based Adaptive VPN. By implementing user-based adaptive VPN, an enterprise can enable either an End-to-End VPN or a Network-based VPN, based on the user identity. The user identity is based on the Network-Access Identifier (NAI), i.e., user@realm. A simple implementation of this would involve allowing some users to create a VPN session only to the enterprise VPN gateway 122, and some others to create a VPN session only to the IPSS 104. For example, in FIG. 1 all data for the officers of an enterprise (officer@company) may be transported over an End-to-End VPN via end-to-end path 152, whereas all data for non-executive staff (staff@company) may be transported over Network-based VPN via network paths $154_a$ and $154_b$ (collectively network tunnels 154). Furthermore, all data for the executives of an enterprise (executive@company) is transported over an End-to-End VPN via end-to-end path 156, or over a Network-based VPN via network paths $158_a$ and $158_b$ (collectively network tunnels 158). In this latter instance, the executives of a company have an option to use a secure end-to-end VPN (path 156), or a network based VPN, where the IPSS 104 serves as an endpoint for VPN tunnel $158_a$, as well as a source for VPN tunnel $158_b$.

In the case of an Application-based Adaptive VPN, for the same user, the enterprise can enable End-to-End VPN for some applications and Network-based VPN for other applications. For example, user access to e-mail servers within the enterprise may be provisioned over End-to-End VPN, whereas web-browsing is provisioned over Network-based VPN.

Application-based Adaptive VPN can also use user identity in addition to the application information to select the type of VPN. For example, all data for the officers of the enterprise is transported over an End-to-End VPN 152, all data for non-executive staff is transported over Network-based VPN 154, and for executives, e-mail access is transported over End-to-End VPN 156, whereas access to web and other applications is transported over Network-based VPN 158. Thus, application-based Adaptive VPN is more flexible than User-based Adaptive VPN. Modifications to current VPN clients 134 are required so that a VPN client 130 can open two VPN sessions, one to the enterprise VPN gateway 122 and another to the IPSS 104, and then be able to send packets on the appropriate VPN session based on the application. As User-based Adaptive VPN is a special case of Application-based Adaptive VPN (as described above), further adaptive discussions will be discussed in terms of Application-based Adaptive VPNs.

Figure 2:
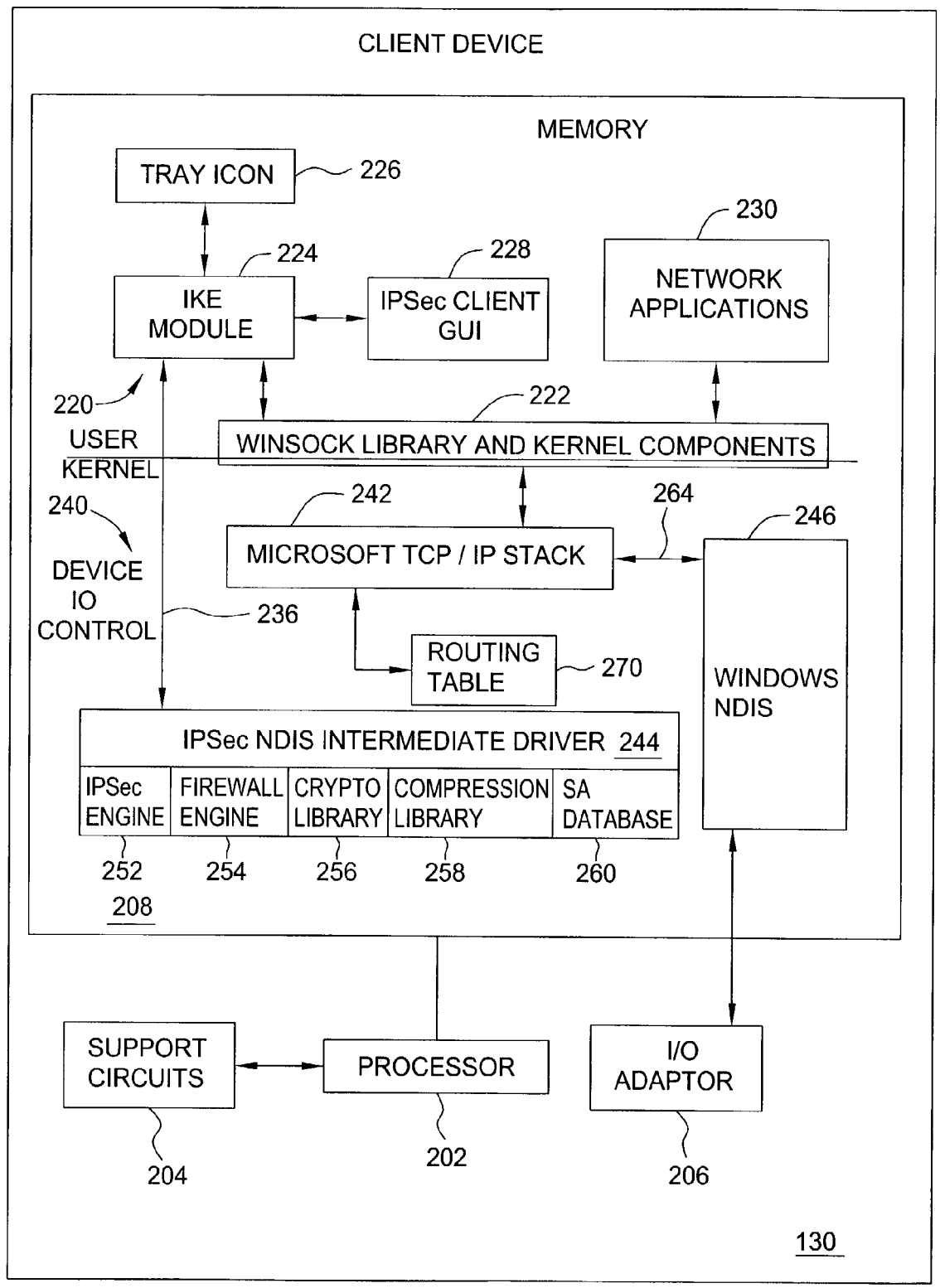
FIG. 2 depicts a block diagram of a client device of the present invention.

FIG. 2 depicts a block diagram of a client device 130 of the present invention. In particular, FIG. 2 depicts a block diagram of an IPsec client device software architecture operating in conjunction with a Microsoft Windows operating system. One skilled in the art will appreciate that similar architecture may be implemented for other types of operating systems.

Specifically, the client device 130 comprises a processor 202, as well as memory 208 for storing various control programs. The processor 202 cooperates with conventional support circuitry 204 such as power supplies, clock circuits, cache memory and the like as well as circuits that assist in executing the software routines stored in the memory 208. As such, it is contemplated that some of the process steps discussed herein as software processes may be implemented within hardware, for example as circuitry that cooperates with the processor 202 to perform various steps. The client device 130 also contains input/output (I/O) circuitry 206, which forms an interface between the various functional elements communicating with the client device 130.

For example, in the embodiment of FIG. 2, the client device 130 optionally communicates with the enterprise intranet 120 via a network interface card, such as an Ethernet adaptor card. However, those skilled in the art will appreciate that other I/O adaptor devices may be utilized, such as fire wire, IR, wireless I/O devices, among others. It is noted that the memory 202 of the client device 150 may include volatile memory (e.g., RAM), non-volatile memory (e.g., disk drive(s), PROM, among others), and/or a combination thereof. For example, in a WINDOWS operating system environment, both volatile and non-volatile memory devices 208 are utilized to store and execute the adaptive VPN programming of the present invention.

Although the client device 130 of FIG. 2 is depicted as a general-purpose computer that is programmed to perform various control functions in accordance with the present invention, the invention can be implemented in hardware as, for example, an application specific integrated circuit (ASIC). As such, it is intended that the processes described herein be broadly interpreted as being equivalently performed by software, hardware, or a combination thereof.

IPsec client 134 (FIG. 1) is the VPN client software that illustratively runs on a Windows client device 130 and enables secure communications to a VPN gateway 122 at a remote network. The IPsec Client 134 authenticates a user to the remote network and encrypts/decrypts the information sent from/received by the user to/from the remote network.

Specifically, the IPsec client programming 134 is stored and executed by various software modules residing in the memory 208 and various hardware devices of the client device 130. The adaptive VPN modules operate in conjunction with the operating system software module 132, and are illustratively discussed as operating with a WINDOWS operating system (e.g., WINDOWS XP operating system), however such operating system should not be considered as limiting. The modules are bifurcated into a user module 220 and kernel module 240.

The user module 220 is provided by the resident operating system comprising WinSock Library and Kernel Components 222, a tray icon 226, and network applications 230. The adaptive VPN modules of the user modules 220 comprise an Internet Key Exchange (IKE) module 224 and an IPsec client GUI 228. It is noted that the WinSock Library and Kernel Components 222 may operate in various circumstances as a user module 220 and/or as a kernel module 240.

The network applications 230 interface with the WinSock Library and Kernel Components 222, while the WinSock Library and Kernel Components 222 interface with the IKE module 224. The IKE module further interfaces with the tray icon 226 and the IPsec client GUI 228.

The kernel modules 240 comprise a TCP/IP stack 242, a WINDOWS Network Driver Interface Specification (NDIS) 246, at least one routing table 270, and an IPsec NDIS intermediate driver 244, which further comprises an IPsec engine 252, a firewall engine 254, a crypto library 256, a compression library 258, and an SA database 260.

The WinSock Library and Kernel Components 222 interface with the TCP/IP stack 242, which interfaces with the WINDOWS NDIS 246 via path 264. The WINDOWS NDIS 246 interfaces with the IPsec NDIS intermediate driver 244, which further interfaces with the IKE module via device I/O control path 236. Furthermore, the WINDOWS NDIS 246 interfaces to the I/O adaptor (e.g., Ethernet adaptor) via path 262.

To support Adaptive VPN, the VPN client 134 is able to accommodate at least two VPN sessions at the same time, one or more from the client to the IPSS (or multiple IPSSs) (network tunnel) and one (or more) from the client to the Enterprise VPN Gateway(s) (i.e., enterprise tunnel). IP packets are sent through the appropriate IPsec tunnel based on filtering rules, which are downloaded to the client device 130 based on the enterprise's security policy.

That is, the IKE module 224 negotiates IKE sessions with two or more external end-points (i.e., IPSS 104 and enterprise gateway 122) at the same time. The IKE module 224 is capable of pushing SA information and keys for multiple IPsec tunnels to the IPsec NDIS driver 244. The SA database 260 maintains information about multiple IPsec tunnels including the host subnet IP addresses and TCP port numbers for which packets should be sent over that tunnel. Further, the IPsec engine 252 adds the appropriate (outer) IP headers, as well as de-multiplexes the packet over the appropriate tunnel, based on the SA database information.

In operation, the IKE module 224 is a user level module that uses the IKE protocol to negotiate the Security Associations (SAs) and keys for the IPsec session with the SMS 126. The SAs and the associated keys are then sent down to the IPsec NDIS driver 244 that resides in the kernel 240. In the case where a Windows operating system is utilized (e.g., Windows 2000, Windows XP, and the like), the IPsec driver 244 is an instance of an NDIS (Network Driver Interface Specification) intermediate driver that resides between the TCP/IP stack 242 and the device level adaptor 206.

The IPsec NDIS driver 244 allows packets to flow from the device adaptor 206 via path 262, through the Windows NDIS driver 246 to the IPsec NDIS driver 244 via path 266, back to the Windows NDIS driver 246 via path 266, and then to the TCP/IP stack 242 via path 264. A similar path is followed in the reverse direction. The IPsec NDIS driver 244 contains code to process all outgoing and incoming IP packets and forward them to the IPsec Processing Engine 252 and the Firewall Engine 254, as needed.

The IPsec Processing Engine 252 is responsible, on a per-packet basis, to decide whether to perform IPsec processing, or pass the packet through without modification after sending the packet through the Firewall Engine 254. The Firewall Engine 254 applies the configured firewall policy. The IKE process module 224 downloads the firewall policy from the SMS 126 during the IKE negotiation. This has the added feature that the client 130 does not have to be pre-configured with the firewall policy of the enterprise. Hash functions and cryptographic functions are inside the Crypto library 256.

The Security Association Database (SADB) 260 stores all the security association information. This database 260 is consulted by the IPsec NDIS driver 244 whenever IPsec processing has to be performed on a packet. The IKE module 224 populates the SA Database 260 through the IPsec NDIS driver 244. The IKE module 224 interfaces with the IPsec NDIS driver 244 through the Device I/O Control path 236.

Figure 3:
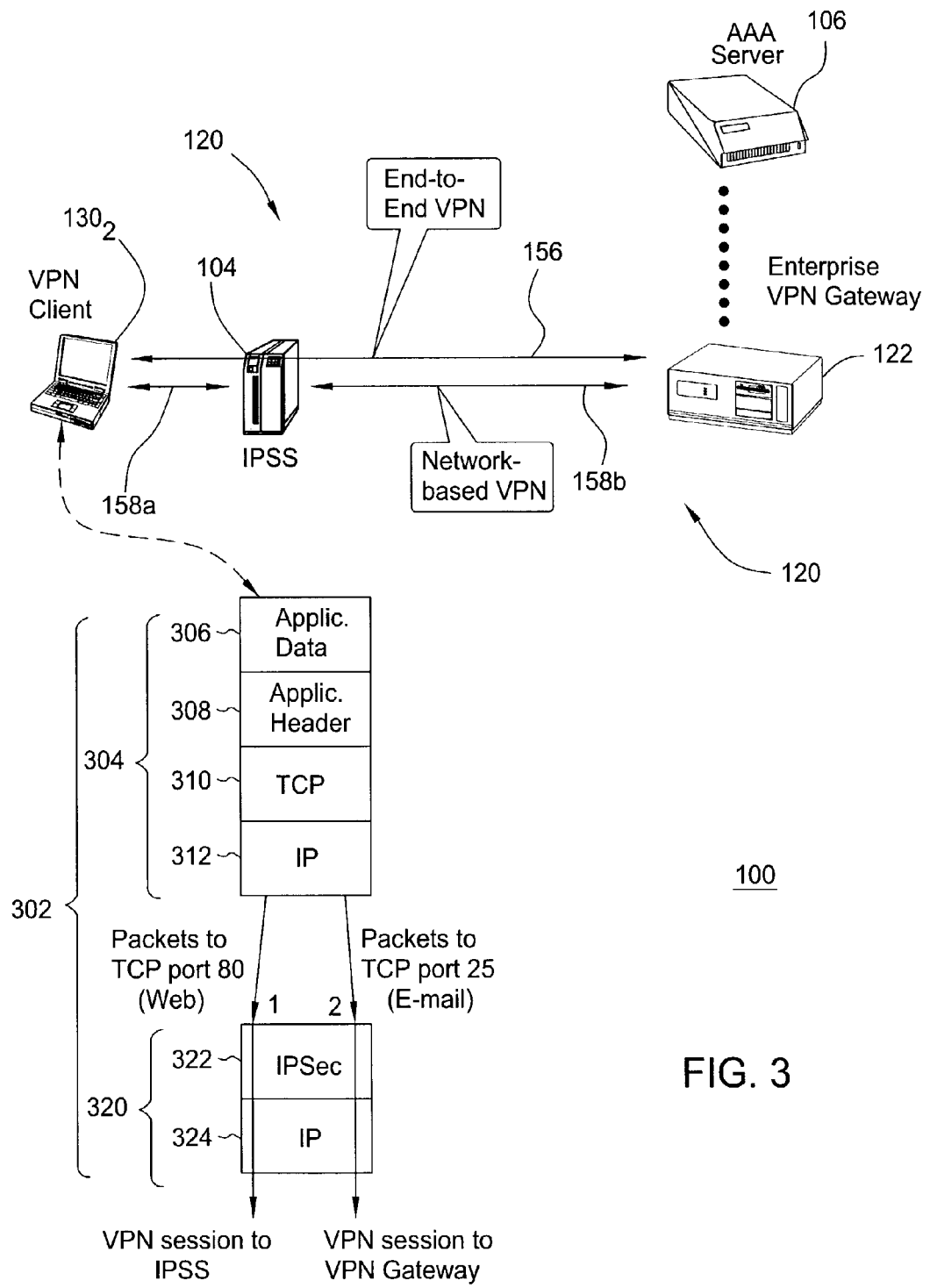
FIG. 3 depicts a block diagram illustrating client-side packet demultiplexing utilizing adaptive VPN of the present invention.

FIG. 3 depicts a flow diagram illustrating client-side packet demultiplexing utilizing adaptive VPN of the present invention. FIG. 3 is the same as presented in FIG. 1, except that only client device $130_2$ and its respective network and enterprise VPNs 158 and 156 are shown. Further, packet 302 is shown being demultiplexed using the adaptive VPN of the present invention. The packet 302 comprises an IP packet portion 304 and an IPsec portion 320. The IP packet portion comprises application data 306, an application header 308, a TCP header 310, and an IP header 312. The IPsec portion 320 comprises an IPsec header 322 and an IP header 324.

A common technique used to provide privacy and data integrity for data in a VPN session is IPsec encryption and authentication. Although the invention is discussed in terms of IPsec, other tunneling techniques (e.g., multi-protocol label switching (MPLS) or any other layer 2/3 tunneling technique) may be used as well. When a VPN session is established between a client 130 and a VPN Gateway (Enterprise VPN Gateway 122 or IPSS 104), the client 130 receives an IP address that belongs to the enterprise subnet. The IP packets generated by the client 130 contain this as the source IP address in its header 312. This packet 304 is encrypted to provide privacy and then authenticated to provide data integrity. Information about the encryption and authentication is added to the packet by encapsulating it within an IPsec header 322. The IPsec packet is then tunneled to the VPN gateway by encapsulating it within another IP header 324. This encapsulating IP header 324 has as its source IP address, the IP address provided by the NSP 102 to the client 130. The destination IP address is that of the VPN Gateway (i.e., IPSS 104 or enterprise gateway 122). The IPsec encrypted VPN session from the client machine to the VPN Gateway is referred to as an IPsec tunnel (e.g., tunnel 156 or $158_a$).

Based on the destination port in the TCP header 310, the inner IP layer 312 sends the packet on one of two IPsec interfaces. Through IPsec interface 1, packets are sent on the Network tunnel 158, and through IPsec interface 2 packets are sent on the Enterprise tunnel 156. In FIG. 3, it is shown that e-mail packets are sent end-to-end to the Enterprise VPN Gateway 122 via tunnel 156, and Web (HTTP) packets are sent to the IPSS 104 via tunnel 158. To support this, a protocol layer 310 needs to be added between the IP and IPsec layers or the existing IPsec layer modified to classify the outgoing IP packets based on source IP, destination IP, source TCP/UDP port and destination TCP/UDP port information, and then encapsulate the packet with the appropriate IPsec header 322 and outer IP headers 324 to be sent on the appropriate VPN tunnel.

Additionally, the client 130 needs IP policy information to be able to classify packets to be sent on the appropriate tunnel. Internet Key Exchange (IKE) is one technique used to download this policy information onto the client, and also to store this information in the Security Association database 260 corresponding to the two VPN sessions on the client. Currently, VPN clients 130 use IKE to exchange keys needed to create a secure IPsec tunnel to a VPN gateway (e.g., ISPP104 or enterprise gateway 122). IKE is based on the framework provided by the Internet Security Association and Key Management Protocol (ISAKMP). There are two phases to IKE. In the first phase (Phase 1), a Diffie-Hellman key exchange takes place between the VPN client 130 and the VPN gateway 104 or 122, which is conventionally known in the art. This is followed by a second phase (Phase 2) where the IPsec Security Associations (SAs) and IPsec keys are exchanged by encrypting this information using the Diffie-Hellman key agreed upon during the first phase. Thus, the second phase is secured by using the key exchanged during the first phase discussed above.

Further, the user is authenticated at the VPN gateway, normally using a Xauth technique, which is conventionally known in the art. In addition, IKE informational messages or Mode-Config messages are used to download policy information from the VPN gateway (104 or 122) to the VPN client 130. In general, the policy information currently downloaded consists of a set of subnet IP addresses. Any packet with a destination IP address that falls within one of these subnets is sent over the VPN tunnel to the VPN gateway. Any packet with a destination address outside of these subnets is sent directly to the Internet 140. This policy information may be received by the VPN gateway from the AAA server 106 within the enterprise 120.

The VPN clients 130 may also use the same technique to download the policy information needed to classify packets from the Enterprise VPN Gateway, and route them over the appropriate tunnel. To support application based Adaptive VPN, in addition to IP subnet information (i.e., destination IP addresses inside the enterprise for which packets from the client need to be sent over either the Enterprise tunnel or the Network tunnel), the rules in the policy also specify the TCP/UDP port numbers and the domain name server (DNS) name or IP address of the IPSS, which will provide Network-based VPN service for a user. Specifying DNS names instead of IP addresses enable intelligent selection of the IPSS 104 endpoint by a DNS.

Figure 4:
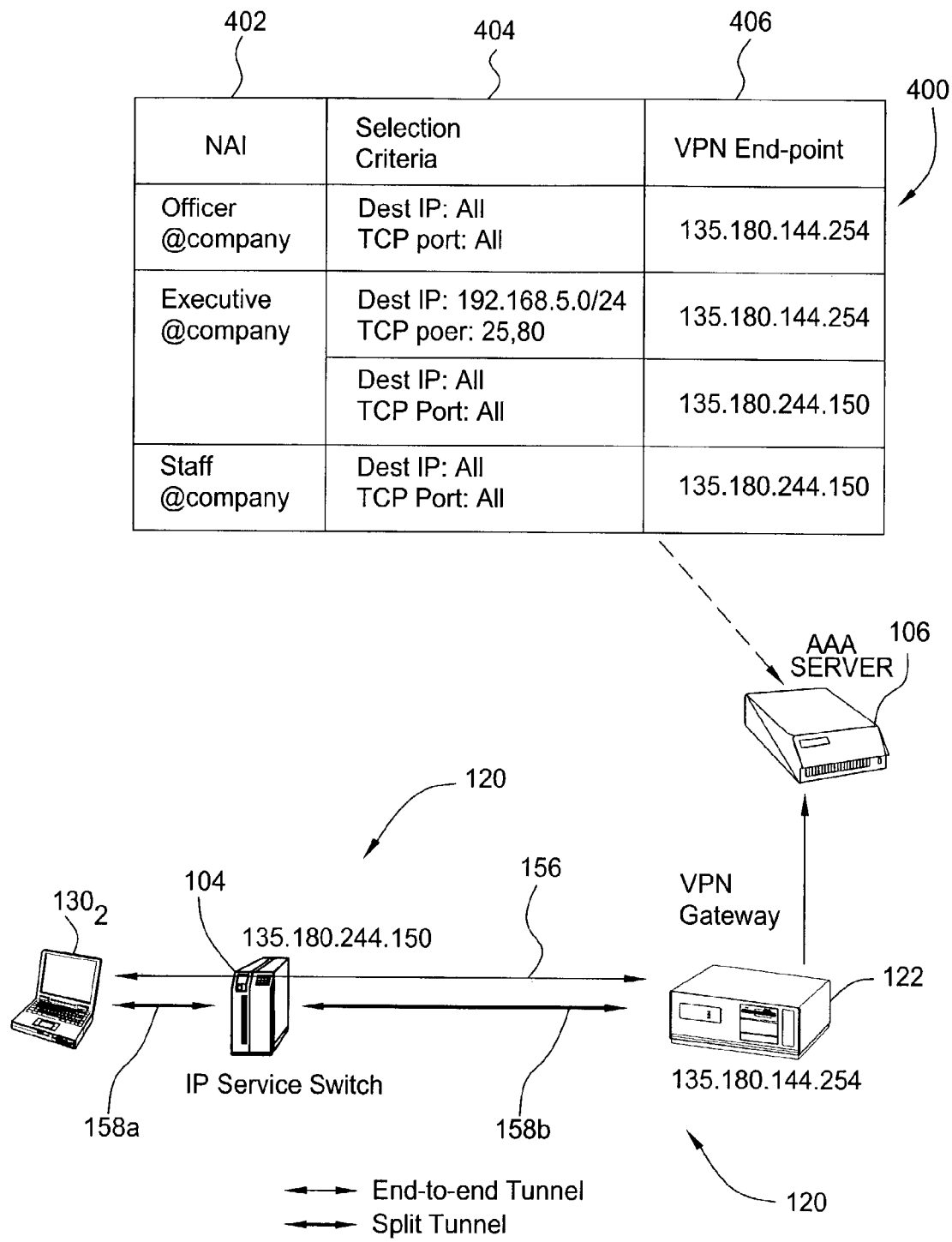
FIG. 4 depicts a block diagram for downloading adaptive VPN policies of the present invention.

FIG. 4 depicts a flow diagram for downloading adaptive VPN policies of the present invention. FIG. 4 is the same as shown in FIG. 3, except that exemplary physical IP addresses of the endpoints, as well a table 400 illustrating policy rules stored in memory (not shown) at the AAA server 106 are provided. That is, FIG. 4 shows an example of such information being maintained at the AAA server 106 from which the VPN gateway 122 can download the policy before sending it to the VPN client 130.

Referring to the table 400 of FIG. 4, the rules are listed for each NAI 402 and are to be applied in order in which they appear in the table 400 for that particular NAI 402. For NAI Officer@company, the exemplary policy rule specifies that all packets 302 should be sent to a VPN end-point whose IP address is 135.180.144.254, which is the IP address of the Enterprise VPN Gateway 122. For NAI staff@company, the exemplary policy specifies that all packets 302 should be sent to a VPN end-point whose IP address is 135.180.244.150, which is the IP address of the IPSS 104. For Executive@company, an exemplary first rule specifies that if the packet 302 is destined to an IP address within the enterprise subnet 192.168.5.0/24, and if the TCP port is either 25 or 80 (e.g., SMTP (e-mail) or HTTP (web)), the packet is sent to the Enterprise VPN gateway 122. Since the rules are parsed in order, an exemplary second rule specifies that all packets that do not match the first rule should be sent to the IPSS 104. Thus, the encapsulating (outer) IP header 324 will contain either the IP address of the Enterprise VPN gateway 122 or that of the IPSS 104 as the destination address. A person skilled in the art will appreciate that there may be another set of rules for packets that do not have to be sent over either one of the VPN sessions, but can be sent directly onto the Internet 140.

It is noted that when Network-based VPN packets are received at the IPSS 104 and decrypted, the IPSS 104 determines whether to either send the packets on an IPsec tunnel to the Enterprise VPN gateway 122, or send it out unsecured on the public network 140. This decision is based on the destination IP address, as well as the TCP port number. For example, if the IPSS 104 provides Internet off-loading as a value added service, all packets to. TCP port 80, which are not destined to the enterprise, can be sent in the clear towards the corresponding destination IP address. Policy rules for making this decision can also be maintained by the AAA server 106 and looked-up by the IPSS 104.

Figure 5A:
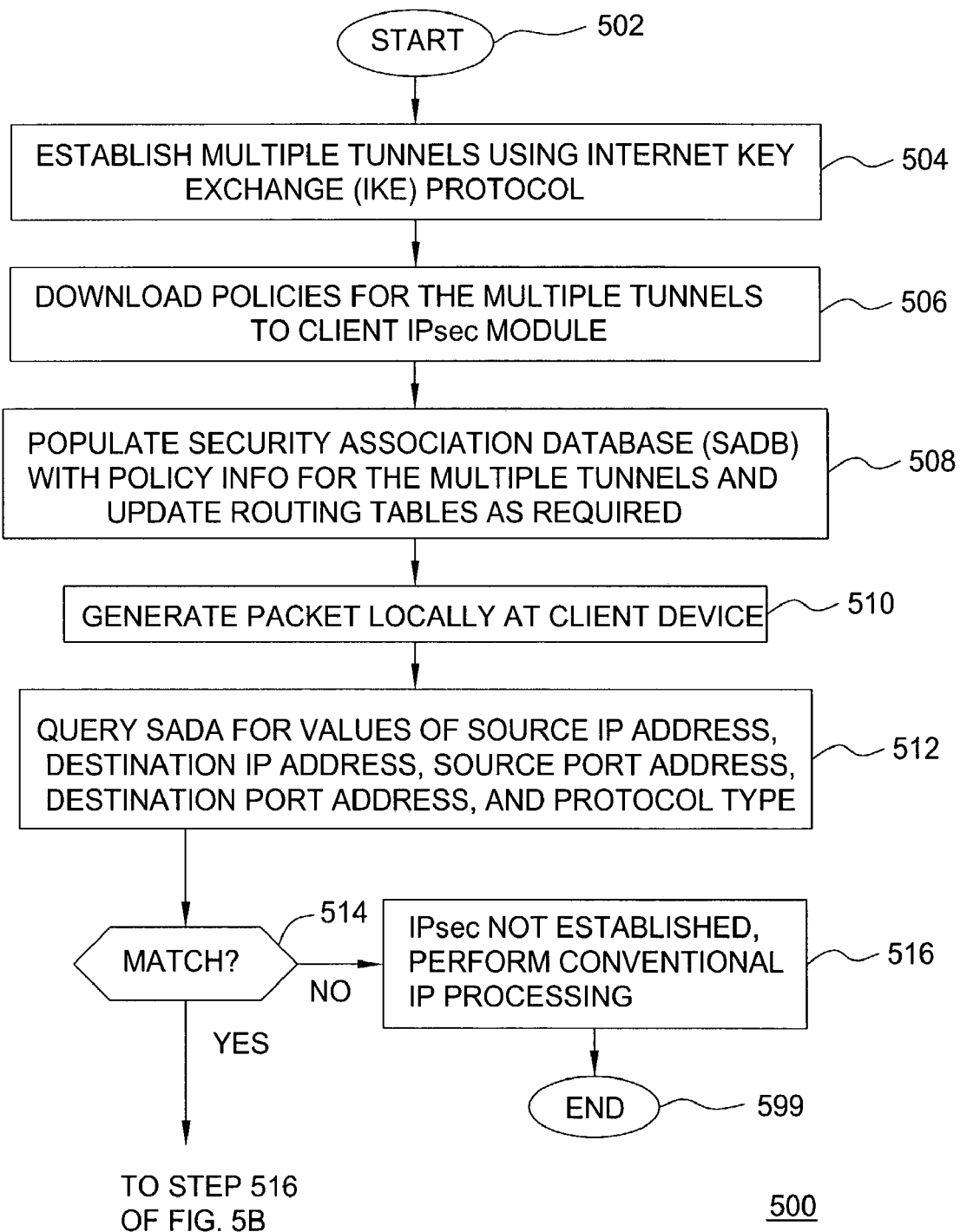
FIGS. 5A and 5B together depict a detailed flow diagram of a method 500 for sending packets over the adaptive VPN of the present invention.
Figure 5B:
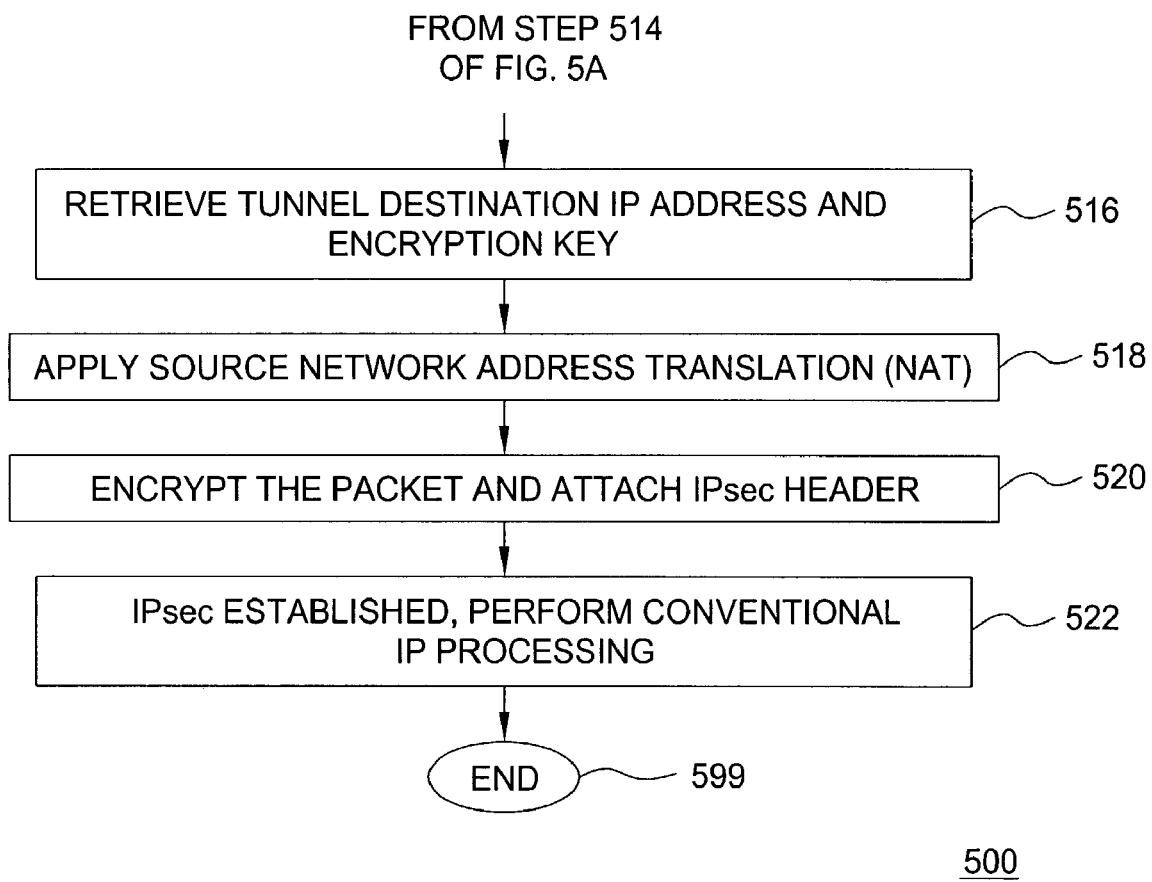

FIGS. 5A and 5B together depict a detailed flow diagram of a method 500 for sending packets over the adaptive VPN of the present invention. FIGS. 5A and 5B should be viewed along with FIGS. 2 and 6.

Figure 6:
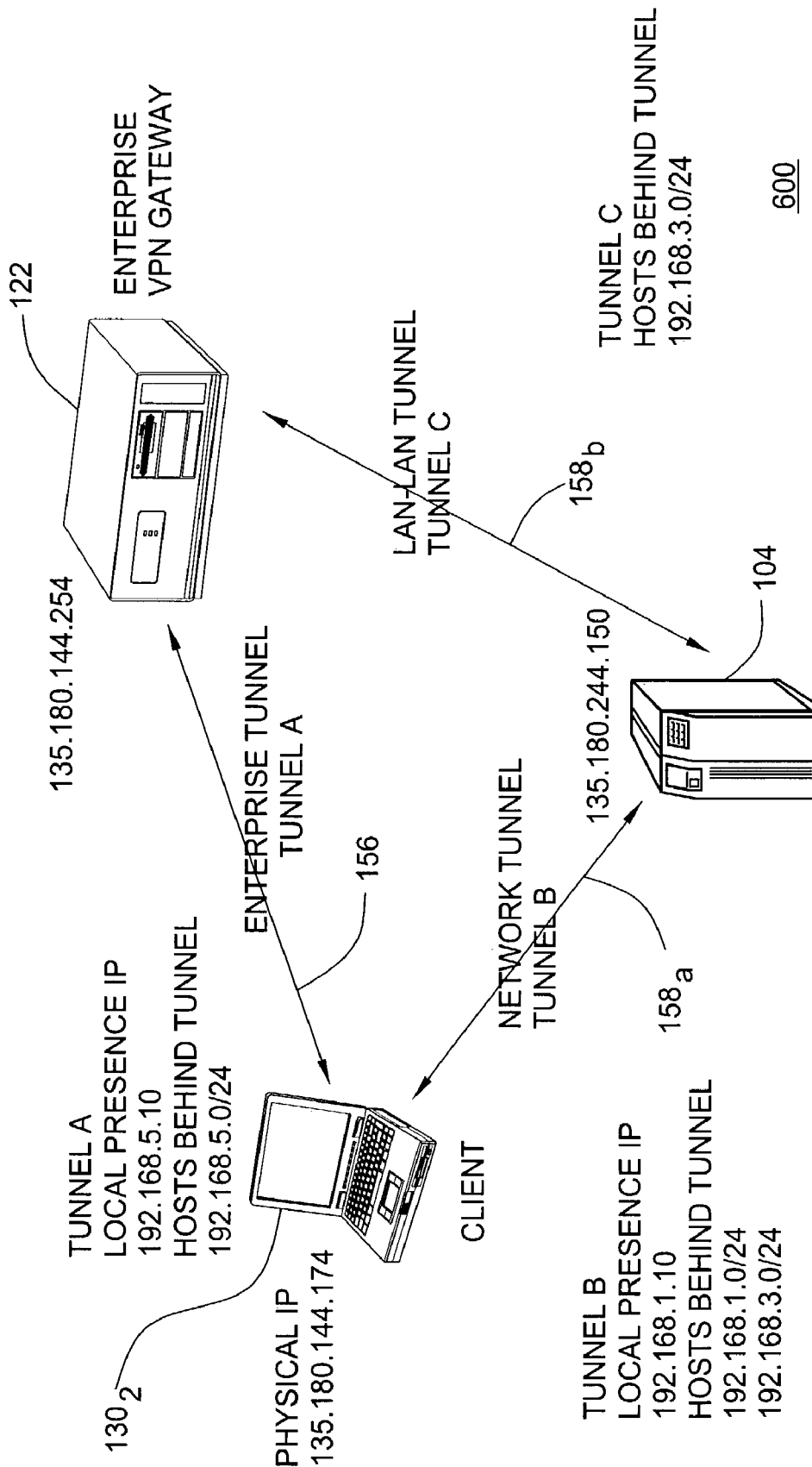
FIG. 6 depicts a block diagram of an exemplary VPN network configuration suitable for illustrating the adaptive VPN of the present invention.

FIG. 6 depicts a block diagram of an exemplary VPN network configuration suitable for illustrating the adaptive VPN of the present invention. The network layout of FIG. 6 is the same as FIG. 3, except that illustrative IP addresses are provided.

Referring to FIG. 6, the client $130_2$ illustratively has a physical IP address 135.180.144.174. A first tunnel 156 is formed from the client $130_2$ to the Enterprise gateway 122 at IP address 135.180.144.254, while a second tunnel $258_a$ is formed to a Network VPN gateway 104 (e.g., IPSS that supports VPN) at IP address 135.180.244.150. For the two tunnels 156 and $158_a$, the local presence IP addresses are 192.168.5.10 and 192.168.1.10 respectively. The hosts (not shown) behind the Enterprise tunnel 156 are in the subnet 192.168.5.0/24, while the hosts (not shown) behind the network tunnel $158_a$ are in subnets 192.168.1.0/24 and 192.168.3.0/24.

Referring to FIG. 5, the method 500 starts at step 502 and proceeds to step 504, where multiple tunnels are established using Internet key exchange (IKE). As described above, in the first phase of the IKE (Phase 1), a Diffie-Hellman key exchange takes place between the client 130 and the SMS 126. This is followed by a second phase (Phase 2) where the IPsec Security Associations (SAs) and IPsec keys are exchanged by encrypting this information using the Diffie-Hellman key agreed upon during the first phase. Thus, the IKE module 224 negotiates IPsec parameters for both of the tunnels with the two VPN gateways (i.e., gateways 104 and 122) to keep both tunnels contemporaneously active.

At step 504, the DNS names or IP addresses of the network VPN gateways, and their policies for the multiple tunnels are downloaded to the IPsec NDIS module 244 of the client device 130. In particular, during the IKE negotiations, the IKE module 224 receives policy information pertaining to the network such as the Local Presence IP Address for the machine (which is an IP address on the enterprise subnet to be used by the machine during the time the IPsec tunnel is enabled) and the subnet IP addresses behind the tunnel on the enterprise. It is noted that the End-to-End (enterprise) tunnel 156 is first established, and then the IP address of the Network VPN gateway 104 is downloaded from the Enterprise through the enterprise tunnel 156 as par of the download policy.

At step 508, the security association database (SADB) 260 is populated with the downloaded policy information for the multiple tunnels. Furthermore, the routing tables 270 are also updated, as required. The IKE module 224 updates this information on the local machine (e.g., client device $130_2$) by modifying the routing table 270 on the client device 130.

That is, policy information that specifies the subnet IP addresses behind each VPN tunnel is downloaded from the SMS 126 to the IPsec client. This policy information may have been pre-configured on the SMS 126, or the SMS may download the policy for a user from an AAA server 106 when required, and then sent to the client device 130. Specifically, once the IKE negotiation between the client and the SMS 126 is complete, the IPsec Security Associations and keys that are agreed upon and the policy information, are also downloaded from the SMS 126 to the VPN gateway 122. Thus, the necessary security associations and the keys needed to create a secure VPN tunnel between the IPsec client and the VPN gateway 122 are in fact, negotiated between the IPsec client and the SMS 126, and then this information is downloaded onto the Enterprise VPN gateway/firewall 122 by the SMS 126. From this point on, IPsec traffic to/from the IPsec client is encrypted/decrypted by the VPN gateway 122.

The SA database 260 keeps information about both the tunnels 156 and $158_a$ to enable the IPsec engine 252 to de-multiplex packets on the tunnels. That is, packets destined to subnet 192.168.5.0/24 are sent on the enterprise tunnel 156, while packets destined to subnets 192.168.1.0/24 and 192.168.3.0/24 are sent on the network tunnel 158$_a$. Based on the local presence IP address information, as well as information about the hosts behind each of the tunnels, the IKE process modifies the routing table 270.

At step 510, the client device 130 generates packets locally. Referring to the example shown in FIG. 6, assume that a packet is to be sent to a host destination IP 192.168.5.18. The Windows IP stack 242 performs a route lookup and determines that the packets should be sent through the gateway 192.168.5.10 (tunnel A).

At step 512, the SADB 260 is queried for matching values in the packet headers. This query is made to find the other end-point (that is, the IP address of the VPN Gateway) of the IPSec tunnel through which this packet should be sent. Specifically, the SADB 260 determines (checks) whether 5 parameters (i.e., the source and destination IP addresses in the IP header 312, the source and destination port addresses in the TCP header 310, and the protocol type (e.g., TCP/IP)) are listed therein. It is noted that the SADB and the routing table 270 are two separate entities. The SADB is used to find the IP address of the VPN gateway to send the packet and the keys to encrypt the packet. The routing table 270 is used to decide the next hop in the network to which the packet should be sent and the local interface to use to send the packet.

If at step 514, the 5 parameters in the packet header are not found (match), then the method proceeds to step 516, where IPsec is not established. As such, conventional IP processing is performed on the packet generated by the client device 130, and the method 500 ends.

If at step 514, the 5 parameters in the packet header are found (match), then the method proceeds to step 518, where the tunnel destination IP address and encryption key are retrieved. Referring to FIG. 6, given that this is a local presence IP address, an (inner) IP header 312 is attached to the packet with source IP 192.168.5.10 and destination IP 192.168.5.18. This packet is sent to the IPsec engine 252, which determines, by consulting the SA database 260, that this packet needs to be sent through the Enterprise tunnel 158$_a$ (tunnel A) to the VPN gateway 122 at IP address 135.180.144.254. A route lookup for this IP address reveals that this packet should be sent through interface IP 135.180.144.174.

At step 518, a source network address translation (NAT) is applied, as required. A method for providing the source NAT is discussed below in further detail with respect to FIG. 8.

At step 520, the packet is encrypted, and the IPsec header 322 is attached. In particular, the IPsec engine 252 encrypts the packet, and prefixes the packet with an IPsec header 322. At step 522, IPsec is established and an (outer) IP header 324 with source IP 135.180.144.174 and destination IP 135.180.144.254 is attached to the packet. The packet is then sent to the Enterprise gateway 122 based on the downloaded policy rules and conventional IP processing is performed. The method 500 then proceeds to step 599, where the method 500 ends.

It is noted that in an instance where a packet is to be sent to destination IP 192.168.3.24, then a route table lookup reveals that this packet should be sent through gateway 192.168.1.1, which is reachable through gateway 192.168.1.10. This being a local IP address, the Windows IP stack 242 forms an (inner) IP header 312 with source 192.168.1.10 and destination 192.168.3.24. This packet is then processed by the IPsec engine 252, which consults the SA database 260, and then determines that the packet is sent through the Network tunnel 158$_a$ to the VPN gateway 104 at 135.180.244.150.

A route lookup for this IP address reveals that the interface IP address to send this packet is 135.180.144.174. The IPsec engine 252 encrypts the packet, adds an IPsec header 322, and then adds an (outer) IP header 324 with source IP 135.180.144.174 and destination IP 135.180.244.150. The aforementioned route lookup also reveals that to reach 135.180.244.150, the gateway to be used is 135.180.144.29. The packet 302 is sent through this gateway towards the Network VPN Gateway 104. Thus, the IPsec engine 352 is able to route packets to the appropriate tunnel based on the host within the enterprise to which the packet is destined.

It is further noted that a tunnel between the Network VPN Gateway and the Enterprise VPN Gateway (which is normally referred to as a LAN-to-LAN tunnel) carries packets destined to subnet IP address 192.168.3.0/24. In the example shown in FIG. 6, the hosts behind Tunnel B 158$_a$ at the IPsec client are specified as subnets 192.168.3.0/24 and 192.168.1.0/24. However, the hosts behind Tunnel C 158$_b$ at the Network VPN Gateway 104 only contain subnet 192.168.3.0/24. Although the client 130$_2$ may send packets to both subnets through the Network tunnel 158$_a$, the Network VPN Gateway 104 sends only those packets that are destined to the subnet 192.168.3.0/24 over the LAN-to-LAN tunnel 158$_b$. Packets destined to 192.168.1.0/24 will be routed directly through other routes.

Moreover, it is noted that when the client device 130 attempts to establish a network tunnel 158, but fails, the packets that should have been forwarded through the network tunnel 158 are instead forwarded through the End-to-End tunnel 156. In order to accomplish this, the policy at the client SADB 260 is modified appropriately. Further, the client device 130 sends information back to the SMS 126, so that the SMS 126 can change the firewall and other policies at the Enterprise VPN Gateway 122 to allow these packets to be accepted at this Gateway. Accordingly, the present invention provides fault tolerance in the event of failing to establish a network tunnel 158.

Figure 7:
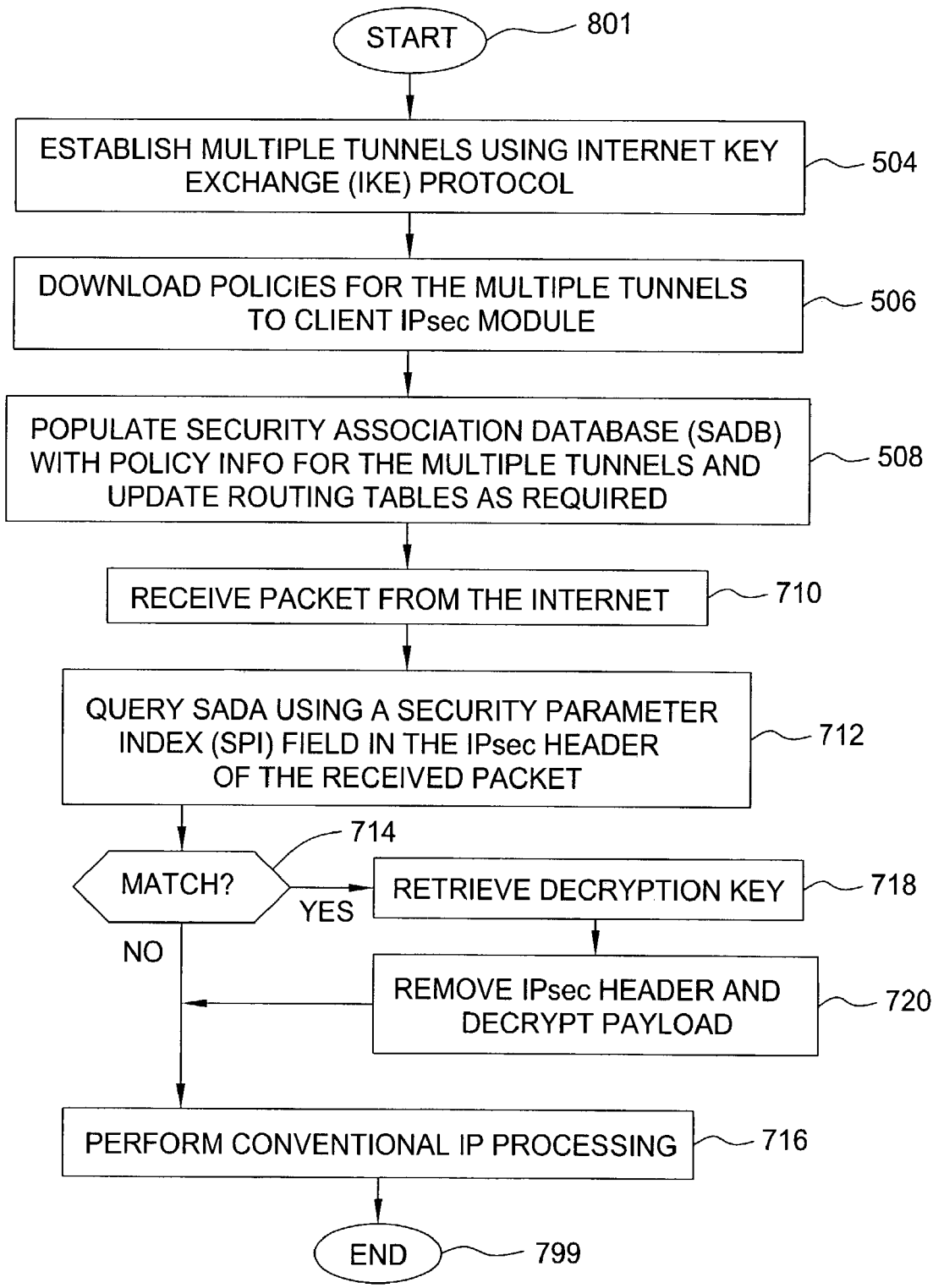
FIG. 7 depicts a detailed flow diagram of a method 700 for receiving packets over the adaptive VPN of the present invention.

FIG. 7 depicts a detailed flow diagram of a method 700 for receiving packets over the adaptive VPN of the present invention. The method 700 starts at step 701 and proceeds to steps 504 through 508 as discussed above with respect to FIG. 5. That is, IKE is utilized to establish both the enterprise tunnel 156 and the network tunnel 158. The policies for the two tunnels are downloaded from the enterprise gateway 122 and populated in the SA database 260 of the client device 130.

At step 710, the client device receives packets from the Internet 140. At step 712, the SADB 260 is queried using a security parameter index (SPI) field of the incoming packet's IPsec header 322. That is, the SPI field contains information regarding the SADB entry, which should be used to perform IPSec processing on this packet. In particular, when packets are being sent out, the inner IP header 312 and the TCP header 310 may be used to look up the SADB 260 as described above. When packets are received, the inner IP header 312 and TCP header 310 are encrypted. As such, the SADB entry that is consulted is indicated in the SPI field on the IPSec header 322.

If at step 714, the SPI field of the IPsec header 322 does not match the entry in the SADB 260, then the method proceeds to step 716, where conventional IP processing is performed, and the method 700 ends at step 799.

If at step 714, the SPI field of the IPsec header 322 does match the entry in the SADB 260, then the method proceeds to step 718. At step 718, the IPsec engine 252 retrieves the decryption key from the SADB 260, and at step 720, the IPsec engine 252 uses decryption key to remove the IPSec header 322 from the packet, and then decrypts the packet payload using the decryption key and the crypto library 256. At step 716, the decrypted packet is then processed in a conventional manner known in the art, and at step 799 the method 700 ends.

The methods 500 and 700 described above illustrate Adaptive VPN only in cases where the selection of the appropriate tunnel is made based only subnet policy rules (a common scenario). Application-based Adaptive VPN as illustrated in FIG. 3 additionally allows for tunnel selection based on the destination TCP port number. Unfortunately, route tables only specify routes based on destination IP addresses, and do not provide the flexibility to specify routes based on a combination of destination IP addresses and TCP port numbers.

Referring back to FIG. 6, assume that it is required that packets destined to the subnet 192.168.5.0/24 be sent on the enterprise tunnel 156 if the destination TCP port number is 25 (e-mail), and sent on the network tunnel 158 if the destination TCP port number is 80 (web). The local presence IP addresses for these two tunnels are 192.168.5.10 and 192.168.1.10 respectively. However, for a packet that is sent to a specific IP address in the 192.168.5.0/24 subnet, in the route table there is no way to specify that the gateway should be 192.168.5.10 if the packet is to be sent to destination port 25, or should be 192.168.1.10 if it is to be sent to port 80. The IPsec client 134 utilizes source return addresses translation to resolve this problem.

Figure 8:
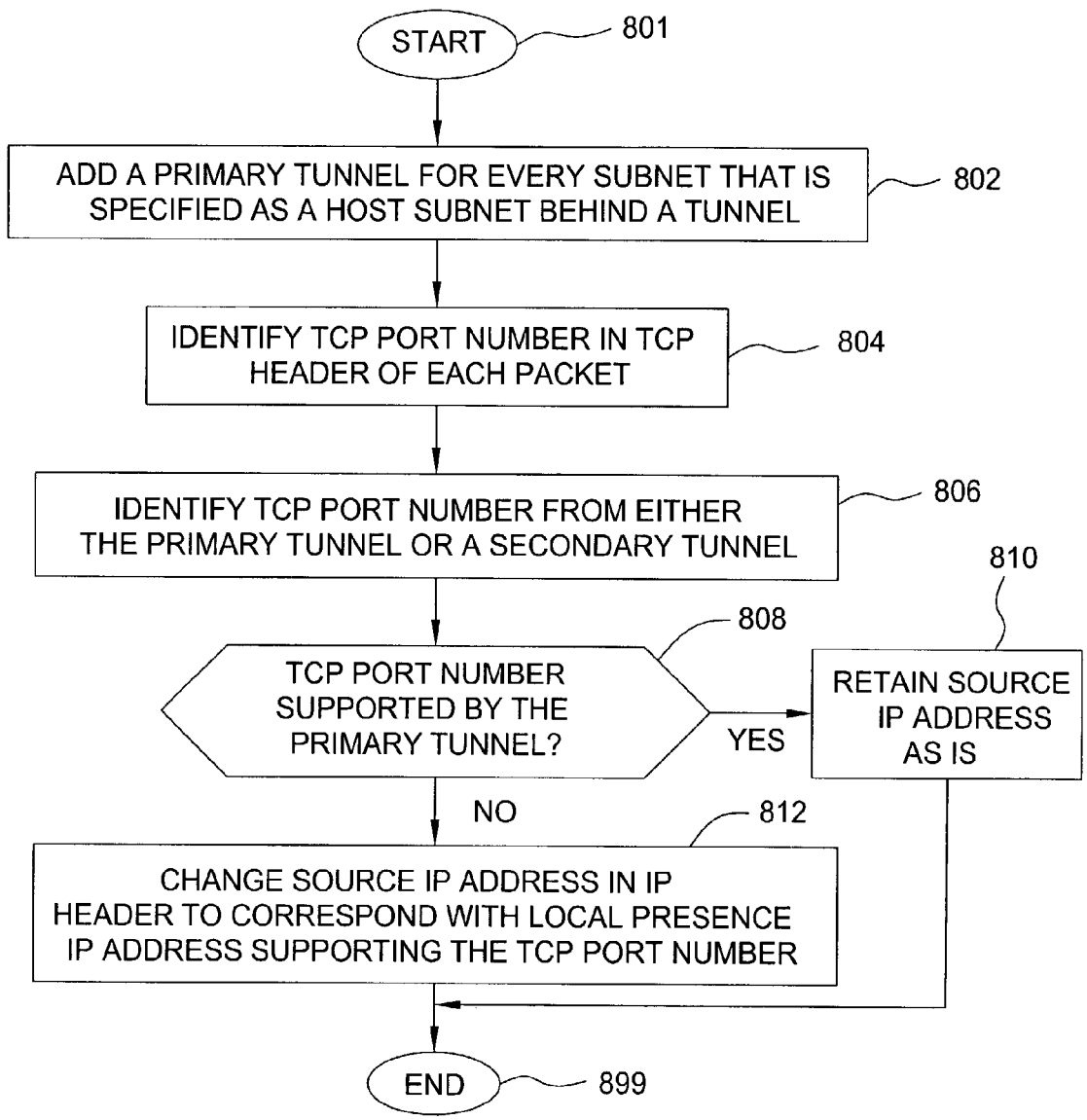
FIG. 8 depicts a flow diagram to provide source IP Network Address Translation (NAT) for the method of FIGS. 5A and 5B.

FIG. 8 depicts a flow diagram of a method 800 to provide source IP Network Address Translation (NAT) for the method 500 of FIGS. 5A and 5B. The method 800 starts at step 801, and proceeds to step 802, where for every subnet that is specified as a host subnet behind a tunnel, only one tunnel will be added to the route table.

For example, as described above, even though 192.168.5.0/24 is a host subnet behind both tunnels, it is added to the route table with one of the local presence IP addresses (in this case 192.168.5.10) specified as the gateway to reach this subnet. The specified local presence IP address is chosen to be that of the most commonly used tunnel to reach a host subnet. This is the tunnel through which a majority of the packets are expected to be sent to that subnet. This tunnel is referred to as the "primary tunnel" for this host subnet. All the other tunnels are classified as "secondary" tunnels for this host subnet. This way, source NAT is performed only on packets that get sent through one of the secondary tunnels, thereby reducing the overhead due to the source NAT operation. Information about which packets (based on the destination TCP port number) are to be sent through the primary tunnel is stored in the IPSec client SADB so that the decision as to whether source NAT has to be performed or not on a packet can be made very efficiently. This means, irrespective of the application (the destination TCP port number), the Windows IP stack 242 will fill in the same IP address as the source IP address.

It is noted that route entries may be added even on a per host basis so that the primary tunnel could be defined at a per host granularity rather than at a per host subnet granularity. In the above example, for all packets destined to 192.168.5.0/24 subnet, the (inner) source IP address is selected as 192.168.5.10. Once this packet reaches the IPsec engine 252, at step 804, the TCP port number in the TCP header 310 is identified. Depending on the destination TCP port number, the source IP address will be left as is (if the packet is to be sent through the primary tunnel), or a (inner) source IP Network Address Translation (Source NAT) will be performed. At step 806, the TCP port number (i.e., program application) is identified from either the primary tunnel or the secondary tunnel.

If at step 808 the TCP port number is supported by the local presence IP address, then the method proceeds to step 810, where the source IP address in the packet IP header 312 is left as is, and the method 800 ends at step 899. Otherwise, at step 812, the source IP address in the packet IP header 312 is changed to the IP address supporting the TCP port number. The method 800 then proceeds to step 899, where the method 800 ends.

For example, if at step 806 the exemplary TCP port number is identified as port 25, the packets illustratively destined to TCP port 25 will be left as is. Otherwise, at step 808 if the exemplary TCP port number is identified as port 80, the packets destined to port 80 will have their source IP changed from 192.168.5.10 to 192.168.1.10, which is the Local Presence IP Address for the Network tunnel.

When the packets are received back at the client from the VPN gateways, reverse NAT is performed on the destination IP address. That is, all packets coming back on the enterprise tunnel 156 will be unmodified, whereas packets coming back on the network tunnel 158 will have their (inner) destination IP address changed to that found in the routing table (in this case 192.168.5.10). Although only two exemplary TCP port values (e.g., 25 and 80) are illustratively shown and described, one skilled in the art will appreciate that other TCP port values representing other application programs may also be utilized to provide additional VPN tunnels.

When the user initiates an Enterprise tunnel, the policy information for the Network tunnel is downloaded over this tunnel from the Security Management Server (SMS) 126. This means, the SMS 126 needs to relate an Enterprise tunnel end-point to a Network tunnel end-point. In the prior art, each tunnel end-point (either Enterprise tunnel or Network tunnel) that is configured is independent, such that there is no way to form a relationship between two end-points. Accordingly, such a relationship is required to support Adaptive VPN.

The SMS 126 comprises a graphical user interface (GUI), which allows an operator to configure the SMS 126. In one embodiment, a Network tab has been added to a Client tunnel end-point editor of the SMS GUI. This allows for a Network tunnel end-point for the client to be configured and associated with the corresponding Enterprise tunnel for the client. In particular, by using this tab, the Network tunnel end-point IP address, the hosts behind the Network tunnel and the Network group key to be used during IKE phase 1 can be configured. As described earlier, these are the policy information for the Network tunnel that are downloaded over the Enterprise tunnel and are then used to initiate the Network tunnel.

In addition, the SMS GUI accommodates the specification of TCP ports in addition to the host subnets behind the tunnels for each of the tunnels. Moreover, the back-end SMS server conveys these port numbers to the client, as well as downloads Network policy information over the Enterprise tunnel to the IPsec client.

Thus, the present invention provides a new technique called Adaptive VPN, which enables Enterprises 120 to trade off security levels for value-added services. Adaptive VPN enables traffic from a specific user to be carried both on an End-to-End VPN session and/or a Network-based VPN session based on the Network Access Identifier (NAI) of a user and the application that is being accessed.

Normally, IKE informational messages or Mode-Config messages are used to download policy from the Enterprise VPN gateway 122 to the VPN client 130. The policy downloads from the Enterprise VPN gateway 130 include (i) TCP port information, in addition to subnet IP address information so that the VPN client can route packets either on the enterprise tunnel or on the network tunnel based on the application specified by the TCP port, and (ii) the IP address of the IPSS so that the VPN client 130 knows the end-point to establish the Network-based VPN tunnel.

In order for a Network Service Provider 102 to provide value-added services, some or all of packet headers and/or application data need to be visible at the device (e.g., IPSS 104) that provides the value-added service. However, with end-to-end VPN, the packetized information is encrypted end-to-end, from the client 130 to the enterprise VPN gateway 122, and neither any of the headers, nor application data is visible within the network. Alternatively, in the case of a network-based VPN, the user VPN session is terminated within the network at an IPSS 104, which allows the IPSS 104 to provide such value-added services.

Network-based VPN enables a suite of value-added services based on IP-header, TCP-header and Application header and data. Such value-added services are possible in instances where the packet headers and application header, as well as application data are made visible within an IPSS 104. The exemplary value added services provided below illustrate some of the benefits of the adaptive VPN of the present invention, and such exemplary value added services should not be considered as an exhaustive list of services or as being limiting.

One such value added service provides VPN traffic aggregation. The IPSS 104 can aggregate traffic on IPsec tunnels from multiple clients onto one IPsec tunnel to the Enterprise VPN Gateway 122, thereby performing traffic aggregation. The Enterprise VPN Gateway 122 only needs to maintain security associations for one (or a few) VPN session(s) from the IPSS 104, and not for all the user VPN sessions as is required with End-to-End VPN.

Another value added service provides denial-of-service prevention. A common denial of service attack is one where an attacker sends a large number of IP packets to a victim with an IP source address that is outside the attacker's subnet. Ingress filtering is a technique where such packets are filtered and dropped. Because it is expected that packets received from the enterprise on the VPN session from the Enterprise VPN Gateway 122 to the IPSS 104 will have an IP address from the enterprise subnet as the source address, any packet with a source IP address outside of this subnet can be dropped, thereby enabling ingress filtering. This is possible because the encapsulated (inner) IP header is visible at the IPSS 104.

A third value added service provides TCP header compression. TCP header compression reduces the size of TCP/IP headers and significantly improves the effective use of low-bandwidth links such as serial links and wireless links. A conventional technique known as Van Jacobson TCP/IP header compression reduces the size of the TCP/IP headers to as few as four bytes. The IPSS 104 can perform TCP/IP header compression/de-compression on packets from/to clients across low-bandwidth links. This is possible at the IPSS 104 if the TCP (and IP) headers are visible.

A fourth value added service provides TCP performance enhancements for wireless networks. In wireless networks, bandwidth and loss characteristics across wireless links affects end-to-end TCP performance, which in turn decreases the effective client throughput for applications based on TCP. A TCP proxy, when implemented between the client and the server, can match the TCP characteristics to that of the wireless link characteristics thereby improving end-to-end TCP performance. This requires TCP/IP headers to be visible at the IPSS 104.

A fifth value added service provides a "statefull" firewall functionality. Normally, an enterprise will allow TCP packets to go out of the enterprise, but will allow TCP packets to come in to the enterprise only if the corresponding TCP connection had been initiated from within the enterprise. This is an example of a statefull firewall functionality, and requires the TCP state to be maintained on a per session basis. Since the TCP header (and the IP header) on packets are visible at the IPSS 104, maintenance of the TCP state is possible at the IPSS 104 and hence, statefull firewall functionality can be provided by the IPSS 104.

A sixth value added service provides Internet offloading. HTTP requests that are destined from the client 130 to servers outside the enterprise can be redirected to the appropriate server from the IPSS 104 without sending these request packets to the enterprise (which will be forwarding them to the same servers anyway). The TCP destination port number (e.g., port 80) is used to identify the HTTP requests.

A seventh value added service provides image and text compression Since the application header and data from the server are visible at the IPSS 104, images (GIF, JPEG), as well as text (HTML) can be compressed and sent to the client 130. Compression is especially useful in wireless environments to efficiently use low-bandwidth wireless links. The type of data (HTML, JEPG, among others) is identified from the HTTP response header.

An eighth value added service provides proxy caching. Since the application header is visible at the IPSS 104, the URL that is contained in the HTTP request header can be inspected. The IPSS 104 may serve as a web proxy, fetch the objects that are requested, deliver them to the client 130, as well as cache them locally so that further requests to the same objects can be served from the cache. In general, responses to HTTP requests from servers within the enterprise will be non-cacheable because of security reasons. Thus, caching may be used in combination with Internet offload.

A ninth value added service provides URL blocking/filtering. An enterprise normally restricts access to some web sites for their users. Instead of receiving these requests and making this decision within the enterprise, these decisions can now be made at the IPSS 104. Given that the application header is visible at the IPSS 104, requests that need to be filtered can be blocked and the corresponding TCP connection from the client closed.

Another value added service provides session-level optimizations for wireless data performance improvement. HTTP pages in general have a large number of references to embedded objects, which are hosted in different domains. A web browser performs a new DNS query for each domain name. Typically, DNS responses cause a delay in a range from 1 to 4 seconds. These DNS queries can account for a large overhead especially across wireless links. To eliminate this overhead, session-level optimization techniques based on URL rewriting may be utilized. With URL rewriting, all embedded URLs in a top level HTML page are rewritten to point to a single domain name (with an IPSS, this will point to a web proxy on the IPSS). This way, only one DNS lookup will be made for all embedded objects; however, the IPSS 104 will still make multiple DNS requests, but such requests are made over a wired line network. Rewriting of the top-level page at the IPSS 104 is possible because the application data is visible.

Although various embodiments that incorporate the teachings of the present invention have been shown and described in detail herein, those skilled in the art can readily devise many other varied embodiments that still incorporate these teachings.

The invention claimed is:

1. A method of providing at least two virtual private network (VPN) tunnels from a client device in a VPN network comprising an enterprise VPN gateway and a network VPN gateway, said method comprising:

establishing said at least two tunnels using an encryption key exchange protocol;

downloading respective enterprise security policies for each of said at least two tunnels, wherein a first tunnel is an end-to-end VPN tunnel to said enterprise VPN gateway, and a second tunnel is a network-based tunnel to said network VPN gateway; and routing packets over one of said at least two tunnels selected based on said downloaded policies.

2. The method of claim 1 further comprising downloading IP addresses of local presences and IP addresses of hosts and destination TCP ports within said hosts respectively associated with said at least two tunnels.

3. The method of claim 2, further comprising storing said IP addresses of said local presence and said hosts respectively associated with said at least two tunnels in a routing table of said client device.

4. The method of claim 1, wherein said packets are routed over one of said first and second tunnels based on user identification.

5. The method of claim 4, wherein said user identification comprises at least one of a user network access identifier (NAI) and a destination IP address.

6. The method of claim 1, wherein said packets are routed over one of said first and second tunnels based on user application programs.

7. The method of claim 6, wherein said user application programs are selected from the group consisting of e-mail and Internet access.

8. The method of claim 6, further comprising routing packets over one of said first and second tunnels based on said IP addresses of said hosts and destination TCP ports within said hosts respectively associated with said at least two tunnels.

9. The method of claim 6, further comprising, for each of said packets, identifying source and destination TCP/UDP port values provided in a TCP header of said packet.

10. The method of claim 1, wherein said first and second tunnels are IPsec tunnels.

11. The method of claim 1, further comprising storing said downloaded policies for each tunnel in a security association database (SADB).

12. The method of claim 11, wherein for a packet generated locally at said client device, said method further comprises querying said SADB for values matching header information of said packet.

13. The method of claim 12, wherein said header information of said packet comprises a source IP address, a destination IP address, a source port address, a destination port address, and a protocol type.

14. The method of claim 13, wherein in an instance where said packet header information does not match said SADB values, said method further comprises performing conventional IP processing.

15. The method of claim 13, wherein in an instance where said packet header information matches said SADB values, said method further comprises:
retrieving tunnel destination IP address and an encryption key from said SADB;
encrypting said packet;
attaching an IPsec header; and
performing conventional IP processing.

16. The method of claim 14, wherein after retrieving said tunnel destination IP address and said encryption key from said SADB, said method further comprises applying source network address translation (NAT).

17. The method of claim 16, wherein said source NAT comprises:
selecting a primary tunnel for every subnet that is specified as a host subnet behind a tunnel;
identifying a packet port number in a TCP header of said packet;
identifying packet port number from a packet sent over said primary tunnel or a secondary tunnel;
changing said source IP address in said packet header to correspond with a local presence IP address in instances where said port number is sent over a secondary tunnel; and
otherwise, retaining said source IP address in said packet header in instances where said port number is sent over said primary tunnel.

18. The method of claim 11, wherein for a packet received over an Internet connection at said client device, said method further comprises:
querying said SADB for a decryption key;
decrypting said received packet; and
performing conventional IP processing.

19. The method of claim 18 wherein said querying comprises using a security parameter index (SPI) of said received packet to identify a proper SADB entry.

20. The method of claim 1 wherein while establishing said at least two tunnels said network-based tunnel fails to establish, packets originally destined for forwarding over said failed network-based tunnel are forwarded over said end-to-end VPN tunnel.

21. A client apparatus for providing at least two virtual private network (VPN) tunnels, comprising:
an Internet key exchange (IKE) module;
an IPsec Network Driver Interface Specification (NDIS) driver interfacing with said IKE module, said IPsec NDIS driver comprising a security authentication database (SADB) that stores policy information for each of said at least two tunnels; and
a routing table for respectively storing IP addresses of local presences and hosts respectively associated with said at least two tunnels, said routing table for use in routing packets over one of said at least two tunnels selected based on said downloaded policies.

22. The apparatus of claim 21, wherein a first VPN tunnel is formed end-to-end between said client apparatus and an Enterprise VPN gateway, and a second VPN tunnel is formed between said client apparatus and an IP service switch (IPSS).

23. The apparatus of claim 21, wherein said SADB receives said policy information for each tunnel from an Enterprise VPN gateway via said IKE module.

24. The apparatus of claim 21, wherein said routing table receives said IP addresses from an Enterprise VPN gateway via said IKE module.

25. The apparatus of claim 21, wherein said IPsec NDIS driver further comprises an IPsec engine for prefixing a packet with an IPsec header and an outer IP header.

26. A client apparatus for providing at least two virtual private network (VPN) tunnels, comprising:
means for establishing said at least two tunnels using an encryption key exchange protocol;
means for downloading respective enterprise security policies for each of said at least two tunnels, wherein a first tunnel is an end-to-end VPN tunnel to said enterprise gateway, and a second tunnel is a network-based tunnel to said network VPN gateway; and
means for routing packets over one of said at least two tunnels selected based on said downloaded policies.

27. The apparatus of claim 26, further comprising:
means for downloading IP addresses of local presences and hosts respectively associated with said at least two tunnels.

* * * * *